(12) United States Patent
Shifferaw (10) Patent No.: US 8,955,319 B2
(45) Date of Patent: Feb. 17, 2015

(54) CLOSED-LOOP GEOTHERMAL POWER GENERATION SYSTEM WITH TURBINE ENGINES

(76) Inventor: Tessema Dosho Shifferaw, Albany, CA (US)

( * ) Notice: Subject to any disclaimer, the term of this patent is extended or adjusted under 35 U.S.C. 154(b) by 230 days.

(21) Appl. No.: 13/367,020

(22) Filed: Feb. 6, 2012

(65) Prior Publication Data

US 2013/0199181 A1    Aug. 8, 2013

(51) Int. Cl.
| | |
|---|---|
| *F03G 7/00* | (2006.01) |
| *F01K 23/06* | (2006.01) |
| *F02B 63/04* | (2006.01) |
| *H02K 7/18* | (2006.01) |
| *F01D 15/10* | (2006.01) |
| *F02C 6/00* | (2006.01) |

(52) U.S. Cl.
USPC ............ 60/641.2; 60/641.4; 60/670; 290/1 A; 290/52

(58) Field of Classification Search
CPC ............... F03G 7/00; F03G 7/04; F03G 7/05; F01K 9/00; F01K 9/003; F01K 11/00; F01K 11/02; F01D 1/00; F01D 1/04; Y02E 10/10; Y02E 10/12; Y02E 10/16; Y02E 10/18
USPC ........... 60/641.2–641.15, 645, 651, 654, 670, 60/681, 669, 641.1, 641.4; 290/1 A, 52
See application file for complete search history.

(56) References Cited

U.S. PATENT DOCUMENTS

| | | | | |
|---|---|---|---|---|
| 2,499,772 | A | * | 3/1950 | Osborne ...................... 60/641.1 |
| 3,271,009 | A | | 9/1966 | Wright et al. |
| 3,724,662 | A | | 4/1973 | Ortiz |
| 3,879,951 | A | | 4/1975 | Mason |
| 4,002,032 | A | * | 1/1977 | Bash .......................... 60/641.15 |

(Continued)

FOREIGN PATENT DOCUMENTS

| | | |
|---|---|---|
| SU | 585571 A | 12/1977 |
| WO | 2004070165 A1 | 8/2004 |
| WO | 2011137535 | 11/2011 |

OTHER PUBLICATIONS

Patent Cooperation Treaty, "International Search Report and Written Opinion of the International Searching Authority," document of 14 pages, dated May 2, 2013.

(Continued)

*Primary Examiner* — Christopher Jetton
(74) *Attorney, Agent, or Firm* — Akerman LLP; Michael K. Dixon (57) ABSTRACT

A geothermal power generation system configured to generate power by suspending turbine engines over a pit exposing a geothermal energy source is disclosed. The geothermal power generation system may include a support structure sized to a pit and at least one turbine engine hanging below the support structure. One or more turbine engine deployment systems may be configured to move the turbine engine, i.e. raise or lower, such that a distance between the turbine engine and the geothermal energy source changes. In one embodiment, the turbine engine deployment system may be formed from a plurality of cables extending from a rotatable cable drum on the support structure and downward from a plurality of pulleys positioned along the pulley track. The support structure may also include a pulley track extending from the first base to the second base. One or more electrical transmission lines may extend from the turbine engine.

14 Claims, 12 Drawing Sheets

(56) References Cited

U.S. PATENT DOCUMENTS

| | | | | |
|---|---|---|---|---|
| 4,069,673 | A | * | 1/1978 | Lapeyre .................. 60/641.8 |
| 4,290,714 | A | | 9/1981 | Strange |
| 4,533,526 | A | | 8/1985 | Delacour et al. |
| 5,440,882 | A | | 8/1995 | Kalina |
| 5,484,024 | A | | 1/1996 | Ladd et al. |
| 6,073,448 | A | | 6/2000 | Lozada |
| 7,849,690 | B1 | * | 12/2010 | Lakic ..................... 60/641.2 |
| 2003/0165382 | A1 | | 9/2003 | Suzuki et al. |
| 2010/0031652 | A1 | | 2/2010 | Shnell |
| 2010/0300091 | A1 | | 12/2010 | Lewis |
| 2011/0033293 | A1 | | 2/2011 | Cavalieri |
| 2011/0115229 | A1 | | 5/2011 | Rourke |
| 2011/0318107 | A1 | | 12/2011 | Dighe |
| 2012/0027517 | A1 | | 2/2012 | Shifferaw |
| 2012/0213588 | A1 | | 8/2012 | Shifferaw |

OTHER PUBLICATIONS

Patent Cooperation Treaty, "International Search Report and Written Opinion of the International Searching Authority," document of 12 pages, dated Apr. 5, 2013.

* cited by examiner

CLOSED-LOOP GEOTHERMAL POWER GENERATION SYSTEM WITH TURBINE ENGINES

FIELD OF THE INVENTION

This invention is directed generally to power generation systems, and more particularly to geothermal power generation systems.

BACKGROUND

Gas turbine engines and steam turbine engines have been used to create rotary movement of a shaft to drive generators to create power. Many different fuel sources have been used to fuel the turbine engines. Typically, fuels are combusted within a combustor to rotate a gas turbine engine or, alternatively, steam is created and passed through a turbine assembly to create rotary motion that is useful for generating power with generators.

There is a tremendous amount of volcanic activity under the oceans and lakes throughout the world. One region that is rich in submarine volcanic activity is located in the Pacific Ocean and is referred to as the "ring of fire," which covers all the Pacific Ocean including across most of the West Coast of the United States. This volcanic activity takes place on specific lines in a concentrated region and almost always along one particular line. In most cases, these eruptions occur about 40 to 120 miles from the shore and release significant amounts of energy.

SUMMARY OF THE INVENTION

A geothermal power generation system configured to generate power by suspending turbine engines over a pit exposing a geothermal energy source is disclosed. In one example, the geothermal power generation system may be configured to be positioned at lava lakes in Africa to utilize the heat generated by the lakes by transforming the heat into electrical power. The geothermal power generation system may use one or more turbine engines hanging below a support structure having a turbine engine deployment system configured to move the turbine engine, i.e. raise or lower, such that a distance between the turbine engine and the geothermal energy source may be changed. The geothermal energy source is a relatively constant supply of heat capable of being used to power the geothermal power generation system.

The geothermal power generation system may be formed from a support structure sized to span a pit exposing a geothermal energy source. The support structure includes first and second bases positioned on opposing sides of the pit and a support span extending between the first and second bases across the pit. The first base may include at least one support wheel supporting the first base, and the second base may include at least one support wheel supporting the second base. In particular, the first and second bases may each include a plurality of support wheels. The support structure may also include a pulley track extending from the first base to the second base, and a reinforcing structure extending from the first base to the second base above the support span. The pulley track may extend beyond the first base and beyond the second base and may be supported by a first anchor structure adjacent to the first base and by a second anchor structure adjacent to the second base.

The geothermal power generation system may include one or more turbine engines hanging below the support structure. The turbine engines may be any appropriate configuration for converting hot gases to rotary motion that drives a generator to produce electricity that can be passed along the one or more electrical transmission lines extending from the turbine engine. The electrical transmission lines may have any appropriate configuration. The geothermal power generation system may also include a heat sensor positioned on the turbine engine for sensing the heat from the geothermal energy source.

The geothermal power generation system may include one or more turbine engine deployment systems configured to move the turbine engine such that a distance between the turbine engine and the geothermal energy source changes. The turbine engine deployment system may include a plurality of cables extending from a rotatable cable drum on the support structure. The plurality of cables may extend downward from a plurality of pulleys positioned along a horizontal pulley track. Alternatively, the turbine engine deployment systems may include a scissor lift formed from a plurality of linked, folding support arms forming a crisscross X pattern. The scissor lift may be supported by rollers positioned along a horizontal pulley track. The geothermal power generation system may include one or more electrical transmission lines extending from the turbine engines.

During operation, the turbine engines are attached to the turbine engine deployment system and positioned over the geo thermal energy source. Heat generated by the geothermal energy source rotates turbine airfoils within the turbine engine, thereby generating rotational motion of the shaft within the turbine engine that is translated to a generator in the turbine engine. The generator produces electricity that is passed from the generator to power grids or directly to power consumption devices via the electrical transmission lines. The turbine engine deployment system may move the turbine engines singularly or all together to most efficiently position the turbine engines relative to the geothermal energy source. The turbine engine deployment system may be used to remove the turbine engines from being positioned within the pit for maintenance and for times when the heat generated from the geothermal energy source is too great for the geothermal power generation system.

The geothermal power generation system may be used in a terrestrial application, such that the vapors, gas, and/or heat from the ground can be used to generate power. In particular, the geothermal power generation system may be used in areas near volcanic activity, above ground areas or land that is hot and may have hot spring activities.

In another embodiment, the geothermal power generation system may be a marine support structure configured to support one or more geothermal power generation turbine engines at a geothermal energy source located in a marine environment. The marine support structure may be configured to support the one or more geothermal power generation turbine engines over or in a water body to generate power from naturally occurring gas sources, such as, but not limited to, volcanic eruptions, gas leaks and the like.

In yet another embodiment, the geothermal power generation system may include a marine gas capture system formed from an extendible container that when deployed extends from a vessel to a sea floor at a fuel source release point. The extendible container of the geothermal power generation system may be formed in a funnel shape. The marine gas capture system may include one or more turbine engines in fluid communication with the marine gas capture system such that gases captured within the marine gas capture system are funneled into the turbine engine to create electrical power.

An advantage of this invention is that the geothermal power generation system creates power from a relatively constant geothermal power source with minimal emissions from the system.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
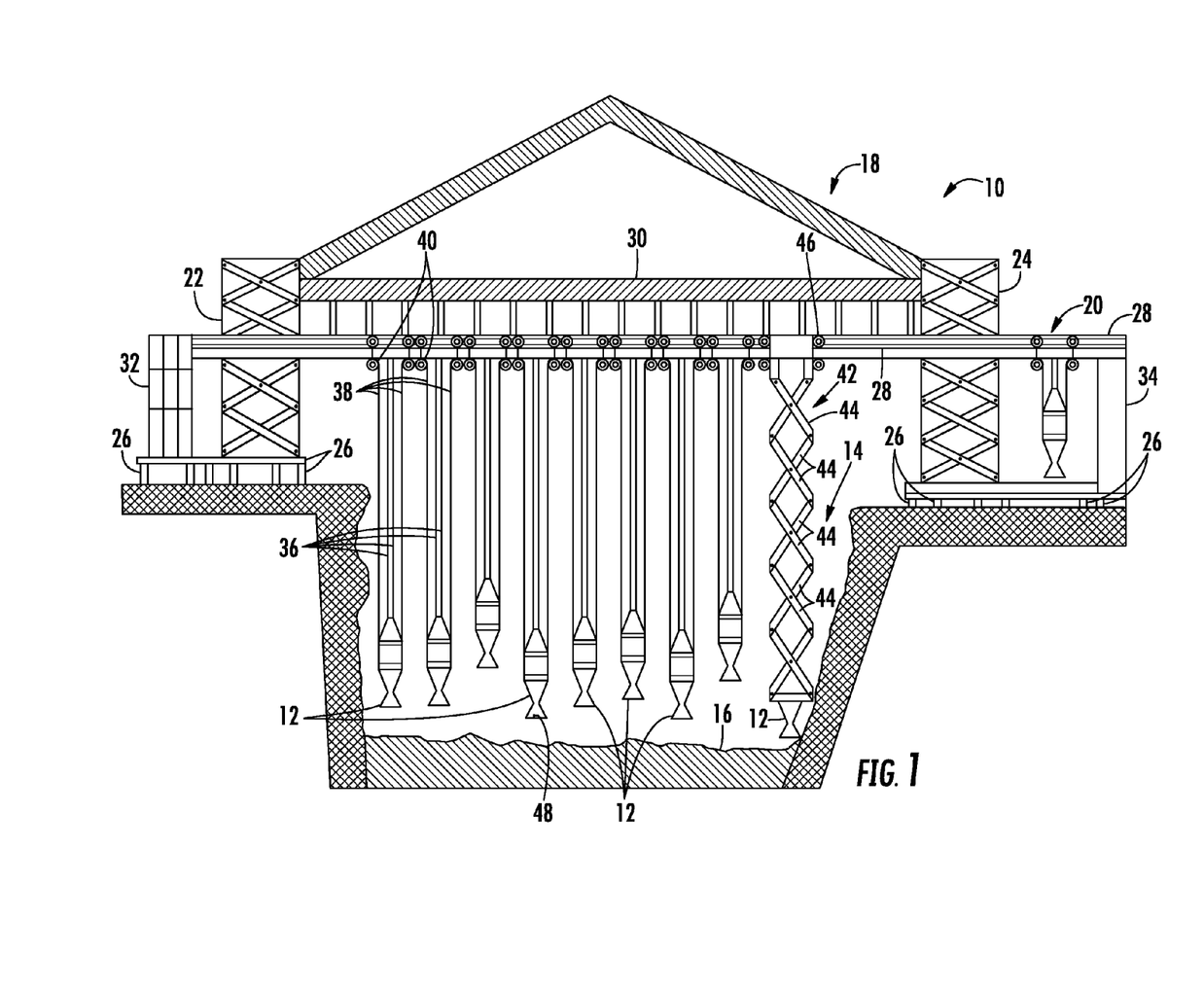
FIG. 1 is a partially exploded top view of the geothermal power generation system.

As shown in FIGS. 1-17, a geothermal power generation system 10 configured to generate power by suspending turbine engines 12 over a pit 14 exposing a geothermal energy source 16 is disclosed. In one example, as shown in FIG. 1, the geothermal power generation system 10 may be configured to be positioned at lava lakes in Africa to utilize the heat generated by the lakes by transforming the heat into electrical power. The geothermal power generation system 10 may use one or more turbine engines 12 hanging below a support structure 18 having a turbine engine deployment system 20 configured to move the turbine engine 12, i.e. raise or lower, such that a distance between the turbine engine 12 and the geothermal energy source 16 may be changed. The geothermal energy source 16 is a relatively constant supply of heat capable of being used to power the geothermal power generation system 10.

Figure 7:
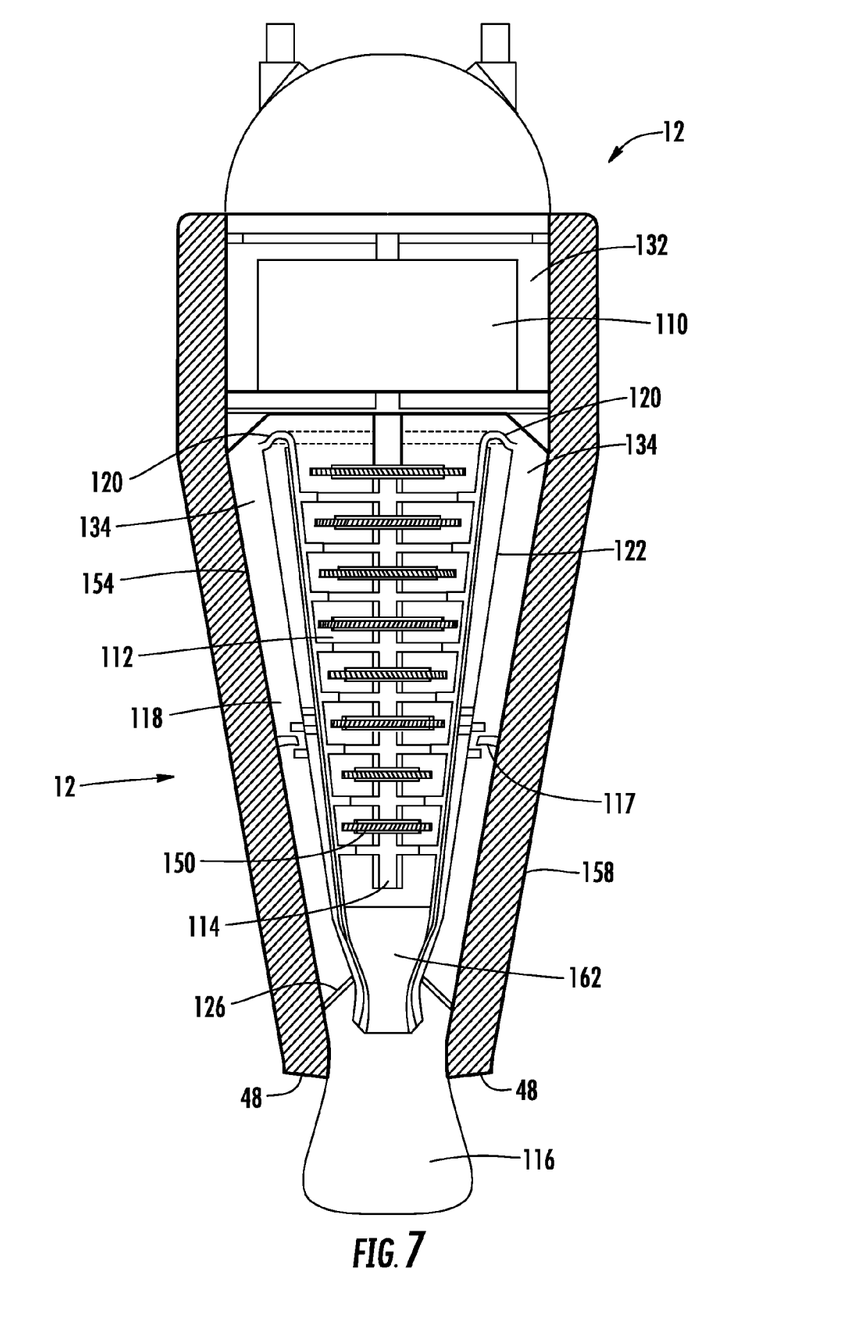
FIG. 7 is a cross-sectional side view of a closed loop turbine engine usable in the geothermal power generation system in an above-ground application.
Figure 16:
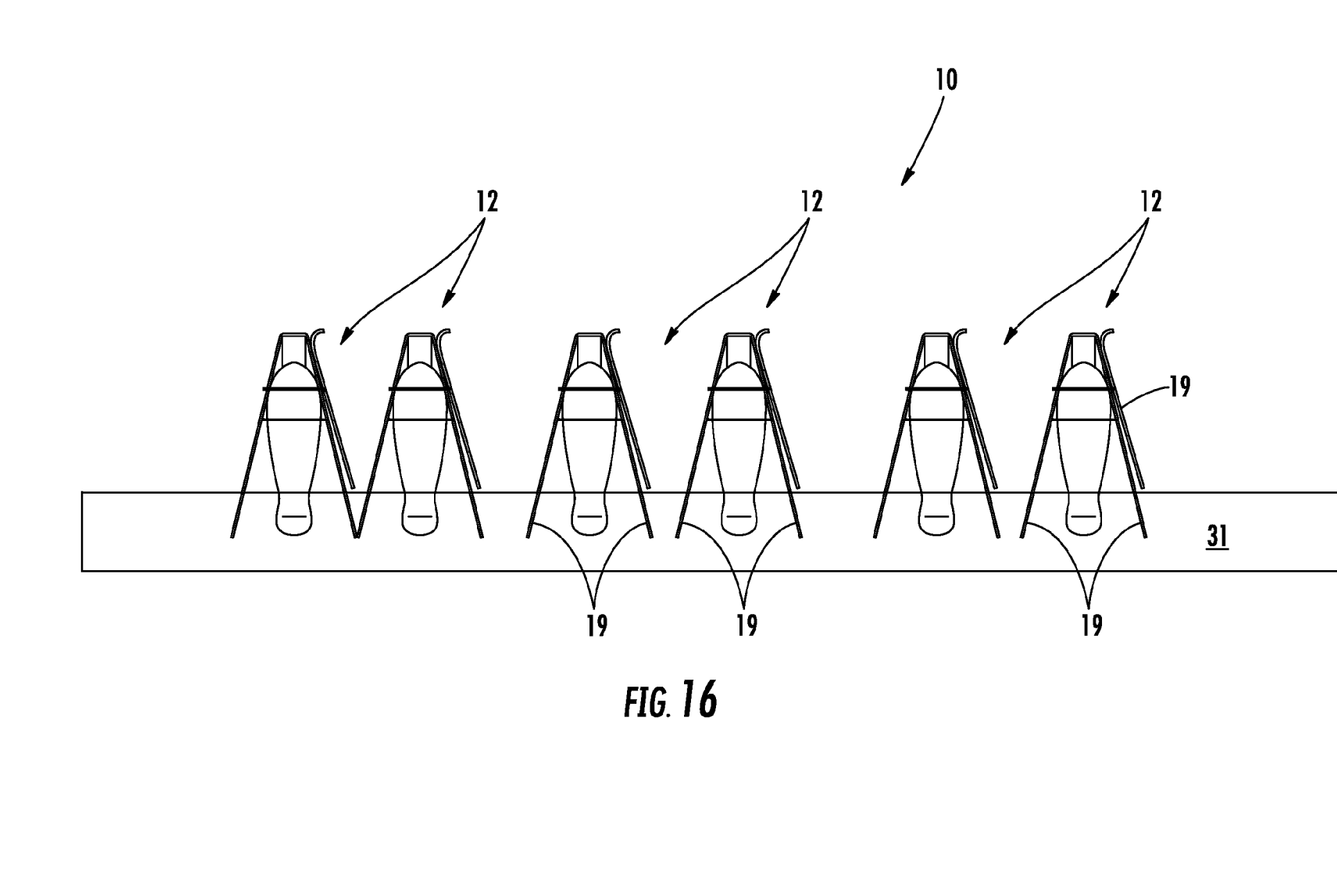
FIG. 16 is an another embodiment of the geothermal power generation system having a support structure formed from one or more support legs.

The geothermal power generation system 10 may include a support structure 18 sized to span the pit 14 exposing a geothermal energy source 16. The support structure 18 may have any appropriate configuration having sufficient strength to support the turbine engines 12 and related components while not being too heavy such that the geothermal power generation system 10 is not moveable. The support structure 18 may be formed from one or more solid beam or from one or more engineered beams. The support structure 18 of the geothermal power generation system 10 may include first and second bases 22, 24 positioned on opposing sides of the pit 14 and a support span 30 extending between the first and second bases 22, 24 across the pit 14. The first base 22 may also include one or more support wheels 26 supporting the first base 22, and the second base 24 may include one or more support wheels 26 supporting the second base 24. In at least one embodiment, either the first base 22 or the second base 24, or both, may include a plurality of support wheels 26. In yet another embodiment, as shown in FIG. 16, the support structure 18 may be formed from one or more support legs 19 configured to support the at least one turbine engine above the geothermal energy source. As shown in FIGS. 7 and 16, the support structure 180 may be formed from three support legs 19 forming at least a tripod support system. The support legs 18 may be formed from any appropriate material capable of supporting the turbine engines 12, such as, but not limited to, steel. The support legs 19 may be formed from a solid structure or may be formed from engineered components with multiple support arms.

As shown in FIG. 1, the turbine engine deployment system 20 of the support structure 18 may also include a pulley track 28 extending from the first base 22 to the second base 24. A reinforcing structure may extend from the first base 220 to the second base 24 above the support span 30. In at least one embodiment, the pulley track 28 of the turbine engine deployment system 20 may extend beyond the first base 22 and beyond the second base 24 and may be supported by a first anchor structure 32 adjacent to the first base 22 and by a second anchor structure 34 adjacent to the second base 24.

The components forming the support structure 18 may be formed from materials capable of supporting the weight of the components and the turbine engines 12 while accounting for the hot environment of the pit 14. The materials may be, but are not limited to being, steel, titanium, and other metals and alloys.

The geothermal power generation system 10 may include one or more turbine engines 12 hanging below the support structure 18. The turbine engines 12 may be any appropriate configuration for converting hot gases to rotary motion that drives a generator to produce electricity that can be passed along the one or more electrical transmission lines 36 extending from the turbine engine 12. The electrical transmission lines 36 may have any appropriate configuration. In terrestrial applications, the geothermal power generation system 10 may be configured such that the turbine engines 12 use materials other than water, such as, but not limited to, wood alcohol (methanol), typically having a very low boiling point around 64° C. The geothermal power generation system 10 may also include a heat sensor 48 positioned on the turbine engine 12 for sensing the heat from the geothermal energy source 16.

As shown in FIG. 1, the geothermal power generation system 10 may include one or more turbine engine deployment systems 20 configured to move the turbine engine 12 such that a distance between the turbine engine 12 and the geothermal energy source 16 changes. In one embodiment, the turbine engine deployment system 20 may include a plurality of cables 38 extending from one or more rotatable cable drum 41 on the support structure 18. The plurality of cables 38 may extend downward from a plurality of pulleys 40 positioned along a horizontal pulley track 28. The cables 38 may be releasably coupled to the turbine engines 12 and may be formed from any appropriate material, such as, but not limited to, multi-stranded cable. Each turbine engine 12 may be supported by a cable on each of four sides of the turbine engine 12. In another embodiment, the turbine engine deployment system 20 may include a scissor lift 42 formed from a plurality of linked, folding support arms 44 forming a crisscross X pattern. The scissor lift 42 may be supported by rollers 46 positioned along the horizontal pulley track 28. The turbine engine deployment systems 20 may formed from a metal covered with ceramic to insulate the turbine engine deployment systems 20.

During operation, the turbine engines 12 are attached to the turbine engine deployment system 20 and positioned over the geo thermal energy source 16. Heat generated by the geothermal energy source 16 rotates turbine airfoils within the turbine engine 12, thereby generating rotational motion of the shaft within the turbine engine that is translated to a generator in the turbine engine. The generator produces electricity that is passed from the generator to power grids or directly to power consumption devices via the electrical transmission lines 36. The turbine engine deployment system 20 may move the turbine engines 12 singularly or all together to most efficiently position the turbine engines relative to the geothermal energy source 16. The turbine engine deployment system 20 may be used to remove the turbine engines 12 from being positioned within the pit 14 for maintenance and for times when the heat generated from the geothermal energy source 16 is too great for the geothermal power generation system 10.

Figure 13:
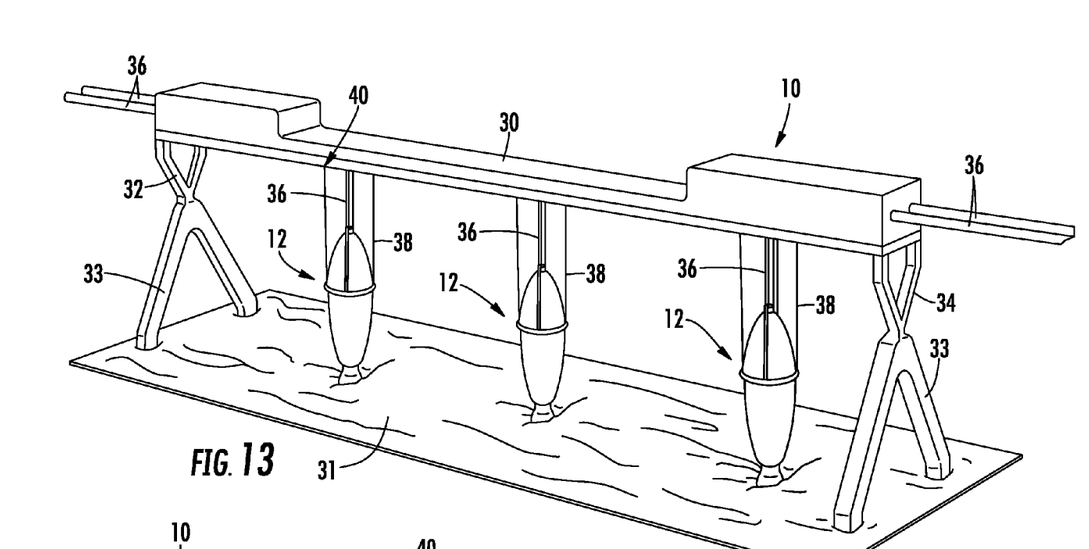
FIG. 13 is a perspective view of an embodiment of the geothermal power generation system used in a terrestrial applications.
Figures 14, 15:
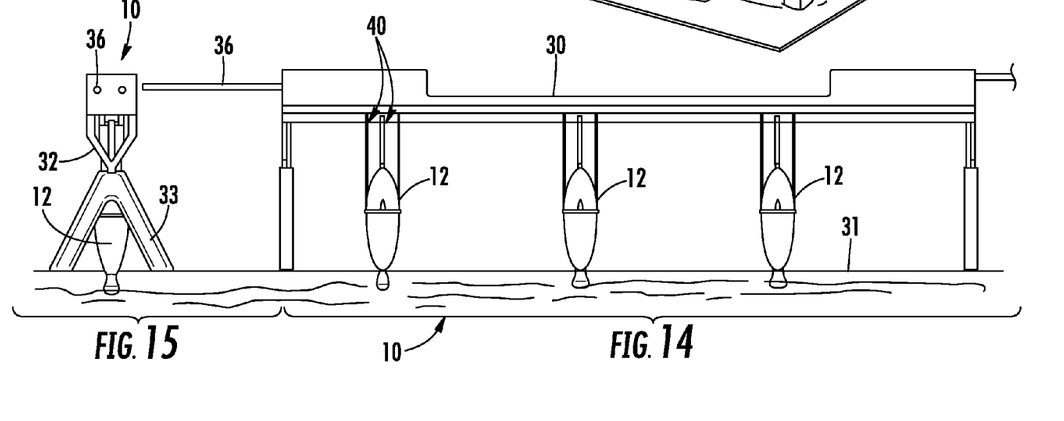
FIG. 14 is a front view of the geothermal power generation system used in a terrestrial applications, as shown in FIG. 13.
FIG. 15 is a left side view of the geothermal power generation system used in a terrestrial applications, as shown in FIG. 13.

The geothermal power generation system 10 may be used in a terrestrial application, such that the vapors, gas, and/or heat from the ground 31 can be used to generate power. In particular, the geothermal power generation system 10 may be used in areas near volcanic activity, above ground areas 31 or land that is hot and may have hot spring activities. In most cases, such as at hot spring areas, the land is hot and the hanging dynamic turbines 12 may be positioned in the ground 31, as shown in FIGS. 13-15, or, in some cases, directly in the hot spring itself. In addition, ground 31 that has been exposed to the sun can also be used as a low heat source and generate low electric power with the geothermal power generation system 10 or in combination with wind turbines or solar power. In the case when exposure to the sun's heat is very mild, smaller turbines can be utilized so that some electricity can be generated. The first and second anchor structures 32, 34 that support the support span 30 may be coated with an insulation 33, such as, but not limited to, ceramic.

The geothermal power generation system 10 may be used in a terrestrial application around volcanic activity. Where there is active volcanic activity or dormant volcanic activity, the ground is typically is very hot. For example, Yellowstone, some parts of the Rift Valley in Africa and in most hot springs areas, the ground and surrounding water is very hot. Such areas are excellent locations for use of the geothermal power generation system 10. Use of the geothermal power generation system 10 in a terrestrial application may occur by immersing or positioning the hanging turbines engines 12 in a ditch or opening in the ground and directing the heat into the turbine engines 12 by covering the turbine engines 12.

In another embodiment, as shown in FIGS. 9-12, the geothermal power generation system 10 may be a marine support structure 50 configured to support one or more geothermal power generation turbine engines 12 at a geothermal energy source 16 located in a marine environment. The marine support structure 50 may be configured to support the one or more geothermal power generation turbine engines 12 over or in a water body 70 to generate power from naturally occurring gas sources, such as, but not limited to, volcanic eruptions, gas leaks and the like. The marine support structure 50 may include a floatation system 52 for supporting the geothermal power generation turbine engine 12. The flotation system 52 may be formed from any appropriate flotation system, such as, but not limited to, a vessel, a platform supported by one or more floating materials, one or more air chambers, and the like.

The marine support structure 50 may include one or more geothermal power generation turbine engines 12 hanging below the marine support structure 50 and may include one or more turbine engine deployment systems 20 configured to move the geothermal power generation turbine engine 12 such that a distance between the turbine engine 12 and the geothermal energy source 16 changes. The geothermal power generation turbine engine 12 may include a heat sensor 48 positioned on the turbine engine for sensing the heat from the geothermal energy source 16. The marine support structure 50 may also include a pulley track 54 of the at least one turbine engine deployment system 20 extending from the marine support structure 50. The turbine engine deployment system 20 may include a plurality of cables 38 extending from a rotatable cable drum 56 on the marine support structure 50. The plurality of cables 38 may extend downward from a plurality of pulleys 40 positioned along a horizontal pulley track 54. The turbine engine deployment system 65 may include a scissor lift 42 formed from a plurality of linked, folding support arms 44 forming a crisscross X pattern. The scissor lift 42 may be supported by rollers 46 positioned along a horizontal pulley track 54. A spool 55 may be used to store the electrical transmission line 36 on the platform 51.

The geothermal power generation turbine engines 12 may be suspended close to the ocean floor or a lake bed, for example, along a particular line where the volcanic activity is occurring. Thus, in operation, geothermal power generation turbine engines 12 use heat energy produced naturally from the volcanic activity occurring under oceans or lakes. Each of the geothermal power generation turbine engines 12 can be positioned very close to the crack or fissure 67 in the ocean floor 66 where the volcanic activity in the form of hot gases and steam is. Moreover, the water pressure from the surrounding sea water controls the heat. The turbine engine deployment system 20 may also be used to lower or raise the turbine engines 12 to further control the heat exposure. In this regard, the turbine engines 12 may have a heat sensor 48 disposed, for example, at the bottom of the ceramic cover, so that when a particular turbine engine 12 becomes too hot, the turbine engine 12 can be raised so that the turbine engine 12 can cool down. When the heat sensor 48 is activated, the heat sensor 48 sends a signal to a computer that controls the turbine engine deployment system 20, which raises the turbine engine 12 up until it cools down enough to again be lowered down near the ocean floor 66.

The marine support structure 50 may also include one or more electrical transmission lines 36 extending from the geothermal power generation turbine engine 12. The transmission lines 36 may be any appropriate transmission line. The transmission line may extend to a distribution facility, which may be located on dry land. The marine support structure 50 may include an electrical transmission line support line floatation system 58 for supporting the electrical transmission line 36. The electrical transmission line support line floatation system 58 may include a plurality of floats 60 extending at least partially above a water surface 64 when floating and positioned at different locations along the electrical transmission line 36 so that it can be easily repaired when needed and maintenance workers do not have to go underwater to repair damaged transmission lines 36. The transmission lines 36 may be suspended to a depth sufficient so that vessels, such as ships, do not collide with the transmission lines 36.

Figure 12:
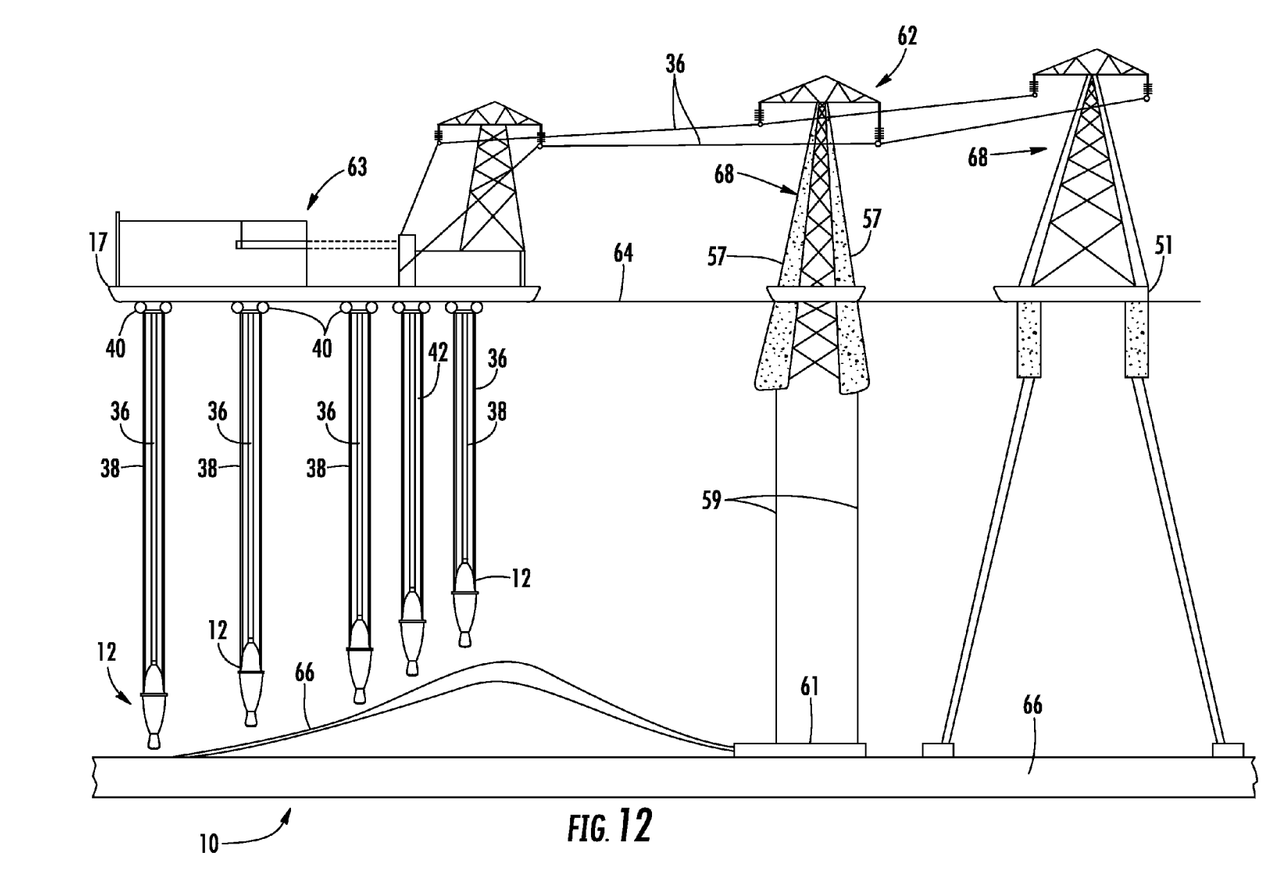
FIG. 12 is an elevation view of another embodiment of the geothermal power generation system including a marine support structure and an over water electrical transmission line support system for marine applications.

In one embodiment, as shown in FIG. 12, an over water electrical transmission line support system 62 may extend upward from a water body floor 66, such as, but not limited to, a sea floor or lake bottom, and supporting the electrical transmission line 36 above a water body surface 64. The over water electrical transmission line support system 62 may be an on-air power transmission cable system, which may include aspects of land power cable transmission systems. The over water electrical transmission line support system 62 may be formed from a support tower 68 extending from the water body floor 66. The over water electrical transmission line support system 58 may be formed from a floating support tower 68 anchored to the water body floor 66. The support towers 68 may be anchored on a platform 51. The platform 51 may be suitably anchored to the ocean floor 66. Each of the support towers 68 may be made out of steel or aluminum, or any other appropriate material.

In another embodiment, as shown in FIG. 13, each of the support towers 68 may be formed from large diameter tubes 57 that are partially submerged in the water and extend all the way up to the electrical transmission lines 36. The tubes 57 may be formed of, for example, metal or plastic, and may be filled with a gas, such as, but not limited to air, and sealed. The tubes 57 may be connected or anchored to the ocean floor 66 using cables 59 and weight 61. Because the tubes 57 are filled with air and sealed (i.e., air tight), the tubes 57 float. Therefore, the tubes 57 are attached to the weights 61 using the cables 59, which extend down to the ocean floor 66. The cables 59 remain in tension because of the buoyancy of the tubes 57, which holds the support towers 68 upright in fair weather and during a storm alike. The air-filled tubes 57 can also have additional weight disposed at the bottom of the tube 57 to help the tube 57 stay upright.

The marine support structure 50 may include one or more transformers 156 to control electric outlet. The transformer 156 may also be supported by float 60. A cable drum 41 may be mounted on the marine support structure 50 for winding up and feeding out the transmission line 36. The surface transmission line 36 may be insulated. The transmission line 36 can also be dropped to the ocean floor 21. During use, the transmission system may automatically cut off power when the power system is about to be compromised, such as, for example, by a storm. When the power system fails, the electric power may be cut off so that there will be no live wires in the water.

Figure 17:
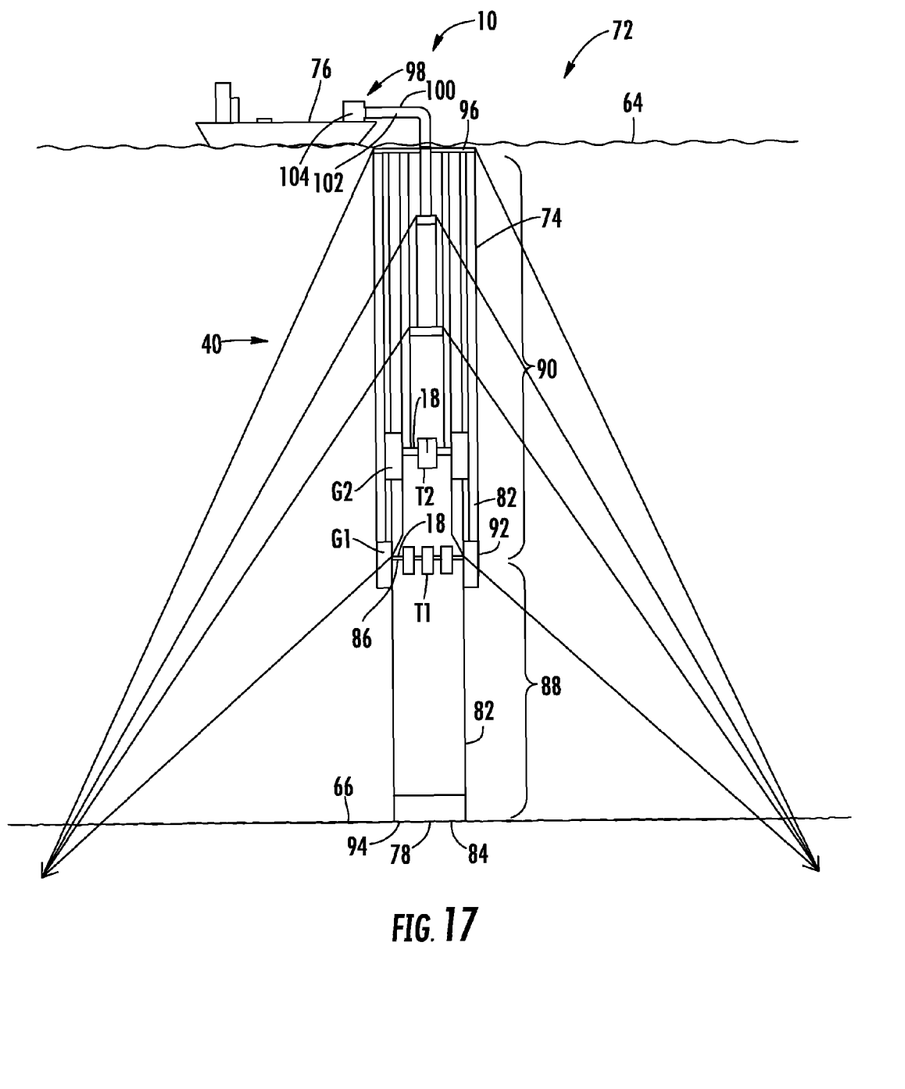
FIG. 17 is a side view of the geothermal power generation system having a marine gas capture system.

As shown in FIG. 17, the geothermal power generation system 10 may include a marine gas capture system 72 formed from an extendible container 74 that when deployed extends from a vessel 76 to a sea floor 66 at a fuel source release point 78. The extendible container 74 of the geothermal power generation system 10 may be formed in a funnel shape. The marine gas capture system 72 may include one or more turbine engines 12 in fluid communication with the marine gas capture system 72 such that gases captured within the marine gas capture system 72 are funneled into the turbine engine 12 to create electrical power. The extendible container 74 may be mounted permanently in place or may be portable. In at least one embodiment, the marine gas capture system 72 may include an extendible container 74 formed from a plurality of decreasingly sized housing sections 82 extending from an inlet 84 to an outlet 86 and formed from one or more first extendible containment housing sections 88 and a second extendible containment housing section 90. The first extendible containment housing section 88 may have a larger cross-sectional area at an end that is closest to the second extendible containment housing section 90 than an end of the second extendible containment housing section 90 closest to the first extendible containment housing section 88. The inlet 84 of the extendible container 74 may be configured to receive leaking fluids. A connector coupling 92 may be positioned between the first and second extendible containment housing sections 88, 90 such that the connector coupling 18 is attached to the first and second extendible containment housing sections 88, 90, thereby placing the first and second extendible containment housing sections 88, 90 in fluid communication with each other.

In one embodiment, the turbine engine 12 may be positioned within the connector 92 connecting adjacent sections of the marine gas capture system 72 together. The marine gas capture system 72 may include an anchoring base 94 coupled to an end of the first extendible containment housing section 88 opposite to the second extendible containment housing 90. One or more support structures 96 may be attached to a terminal end of the extendible container 74. One or more deployment subsystems 98 may be in communication with the support structure 96 to facilitate movement of the extendible container 74 between a deployed position and a storage position. The deployment subsystem 98 may include a plurality of cables 38 extending between the support structure 96 and the extendible container 74. In one embodiment, the support structure 96 may be a floating structure. The support structure may include support arms 100 configured to anchor the support structure 96 to a bottom of a water body 70. In at least one embodiment, the support structure 96 may be a fossil fuel extractor.

The housing sections 88, 90 of the extendible container 74 may be formed from a flexible material. The flexible material forming the housing sections of the extendible container 74 may include, but are not limited to, polyester fabric, polyethylene, and canvas. The extendible container 74 may include a plurality of sections 88, 90 coupled together with connector couplings 92 in addition to the first and second extendible containment housing sections 88, 90. The marine gas capture system 72 may include a conduit 102 placing the extendible container 74 in fluid communication with the vessel 76. The marine gas capture system 72 may also include one or more pumps 104 in fluid communication with the conduit 102 placing the extendible container 74 in fluid communication with a vessel 76.

The marine gas capture system 72 may be anchored to the sea floor through one or more cables 38, chains, or other appropriate materials. The marine gas capture system 72 may also use multiple layers of gas turbines 12. In at least one embodiment, the gas turbines may be positioned in line with each other in adjacent connector couplings 92.

Figure 6:
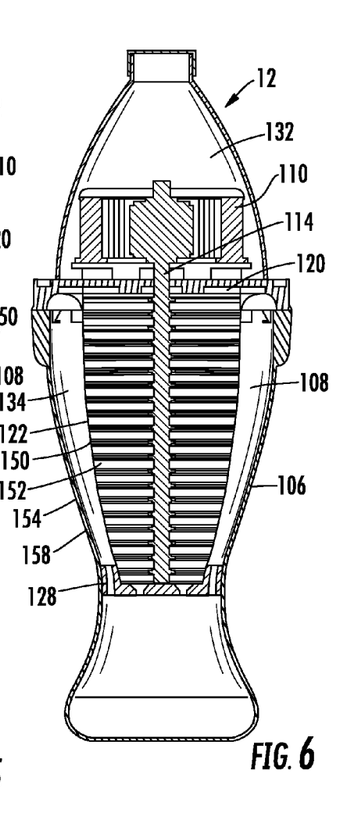
FIG. 6 is a cross-sectional view of the closed loop turbine engine of FIG. 5 taken along section line 6-6.

During use, the turbine engines 12 generate electricity when volcanic gases or vapors or oil such as from an oil leak at the ocean floor 66 rise up into the funnel-like container 74 and through the turbine engines 12, which, in turn, causes the turbine engines 12 to generate power that is transmitted via the electric transmission lines 36 to a surface rig 63 and/or to a power distribution facility and on to a power consumer. In one embodiment, as shown in FIG. 6, a turbine engine 12 may be mounted inside the connector 18, either to a hard plastic or metal portion thereof. The turbine engine 12 may be connected to a corresponding generator 110 disposed outside the funnel-like container 74 and mounted to an outer portion of the connector 18. For example, the generator 110 may be hung from a top portion and anchored at a bottom portion. The generator 110 and electric transmission line 36 may be located outside the funnel-like container 74. Another turbine engine 12 and generator 110 may be positioned in the connector 18 immediately above the turbine engine 12.

The turbine engine 12, as well as voltage regulators, may be submerged in water, and the buoyancy of the turbine engines 12 in water may help the turbine engines 12 retain their position. A cable anchoring system 43 will also serve to ensure that the turbine structure stays in place.

The geothermal power generation system 10 may also be used in applications in other than subterranean volcanic or methane environments where vapors are naturally occurring and escaping from the sea floor 66. By capturing and funneling the vapors into the container 74, the funnel-like container 74 may be used to generate electricity from an energy source that is normally left unused. The geothermal power generation system 10 works similarly as discussed above with respect to the turbine engines 12 within the container 74. As the energy from the gas or vapors released from the sea floor 66 travels upwardly, the turbine engines 12 can be placed at intervals of 20 or 30 feet apart. The turbine engines 12 may be made smaller further and further into the container 74 because the amount of available energy is reduced as the vapors travel upwardly and turn each successive turbine engine 12.

The geothermal power generation system 10 may generate electric power that can be carried by an underwater cable, or transmitted via a surface power cable that is hung with a buoy system to the nearest town or to an electric power distributing center. The transmission line 36 may be waterproof and insulated from the surrounding sea water. For example, the transmission line 36 may be encased in plastic and laid on the ocean floor 66. The geothermal power generation system 10 may be used in miniature/small lakes and river beds where there is volcanic energy available, on a smaller scale.

These embodiments of the geothermal power generation system 10 may use any appropriate turbine engine 12. In at least one embodiment, as shown in FIGS. 2-7, the geothermal power generation system 10 may use a closed loop geothermal power generation turbine engine 12. The closed loop geothermal power generation turbine engine 12 may be formed from a turbine housing 106 forming one or more internal cavities 108. The turbine housing may include an outer cover 158, which may be formed from, but is not limited to, ceramic. The outer cover 158 may cover all but a lower portion of the turbine engine 12 at the boiler 116. The outer cover 158 may be supported, at least in part, by lateral supports 117. The closed loop geothermal power generation turbine engine 12 may include a generator 110 positioned within the turbine housing 106 and a rotor blade assembly 112 positioned within the turbine housing 106 and in communication with the generator 110 via a drive shaft 114. In one embodiment, the turbine housing 106 may be generally torpedo-shaped. The closed loop geothermal power generation turbine engine 12 may also include a boiler 116 in communication with the rotor blade assembly 112. The boiler 116 may be coupled to a steam chamber 116. A condenser 118 may be positioned within the turbine housing 106 and in fluid communication with one or more exhaust outlets 120 of the rotor blade assembly 112 and the boiler 116.

The condenser 118 may be positioned between an outer surface 122 of the rotor blade assembly 112 that forms an inner surface of the condenser 118 and an inner surface 124 of the turbine housing 106. One or more check valves 126 may be positioned between the condenser 118 and the boiler 116. In one embodiment, a fluid steam chamber 162 may be positioned between the boiler 116 and the rotor blade assembly 112. The closed loop geothermal power generation turbine engine 12 may include a plurality of check valves, such as, an upper and a lower check valve 128, 130 positioned between the condenser 118 and the boiler 116 and extending circumferentially around the rotor blade assembly 112. In at least one embodiment, the internal cavity 108 may be formed from an upper chamber 132 housing the generator 110 and a lower chamber 134 housing the rotor blade assembly 112 and condenser 118. The lower chamber may house the boiler 116. The closed loop geothermal power generation turbine engine 12 may include a compressor 136 positioned between the boiler 116 and the rotor blade assembly 112. The compressor may be formed from a plurality of stationary compressor vanes 138 and rotatable compressor blades 140. The rotor blade assembly 112 may be formed from a plurality of stationary rotor vanes 142 and rotatable rotor blades 144. The closed loop geothermal power generation turbine engine 12 may also include a ceramic wall 152 circumferentially surrounding the rotor blade assembly 112 that may form an inner wall 122 of the condenser 118 to promote condensation formation. Outer aspects of the condenser 118 may be formed by a ceramic outer wall 154.

Figure 2:
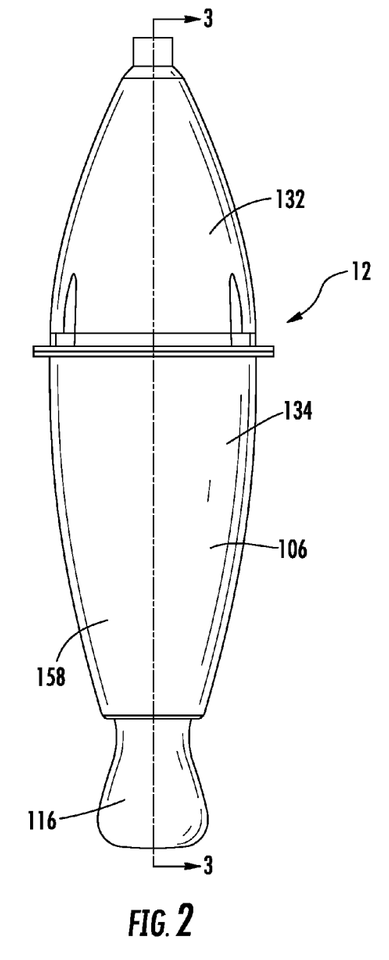
FIG. 2 is a front view of an exemplary closed loop turbine engine usable in the geothermal power generation system.
Figure 3:
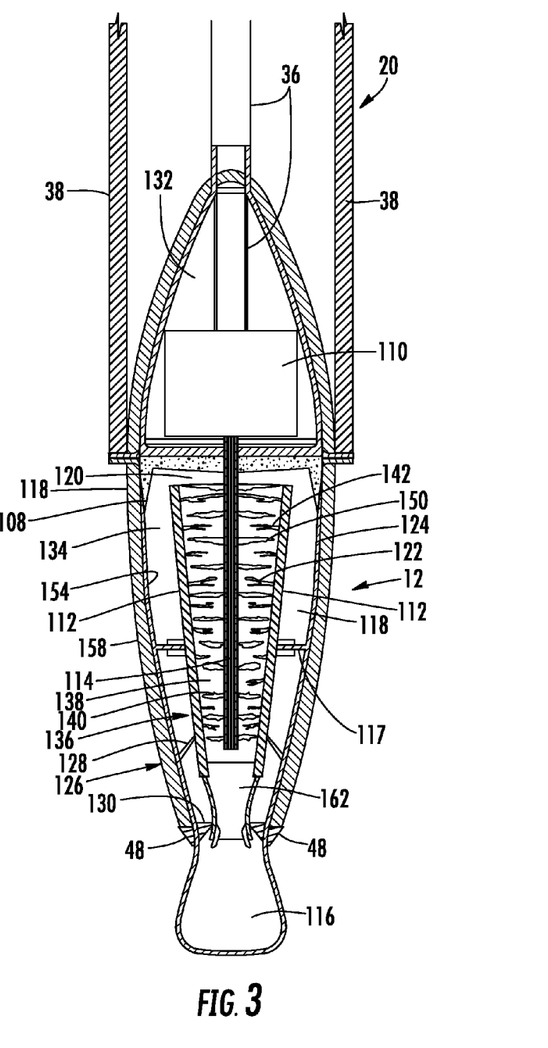
FIG. 3 is a cross-sectional side view of the closed loop turbine engine of FIG. 2 taken along section line 3-3.
Figure 4:
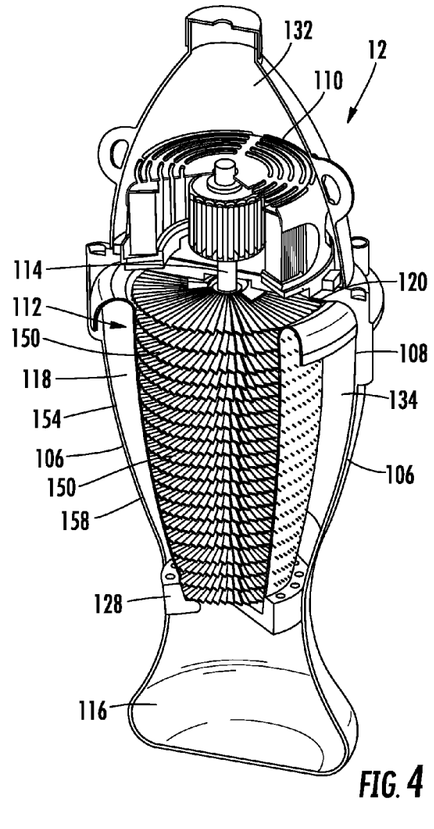
FIG. 4 is a cross-sectional perspective view of another embodiment of a closed loop turbine engine usable in a geothermal power generation system.
Figure 5:
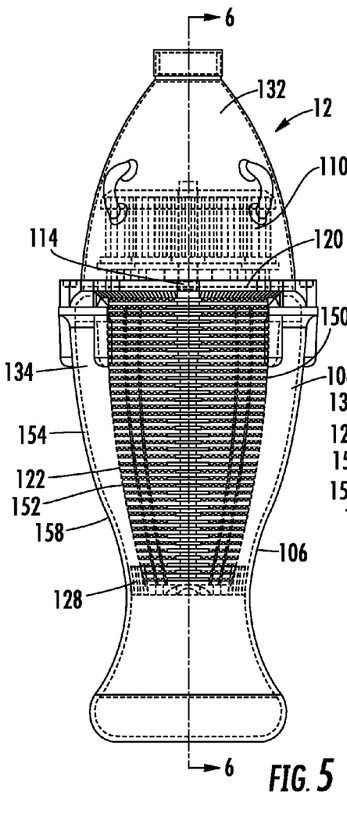
FIG. 5 is a schematic view of the closed loop turbine engine of FIG. 4.

In one embodiment, as shown in FIGS. 2 and 3, the turbine engine 12 is a closed loop device where a fluid, such as, but not limited to, water is contained within a closed loop system and where steam turns the rotor blade assembly 112 and the condenser 118 condenses the steam into water. In this example, sea water cools the steam because of distance from the heat of the volcanic energy source. Thus, the turbine engine 12 can be lowered such that the boiler 116 is close to the volcanic energy source. As the water in the boiler 116 is heated up and turned to steam, the steam rises up into the steam chamber 162 and then through the rotor blade assembly 112 to turn the drive shaft 114. The drive shaft turns the generator 110 to generate electricity. By having a closed loop system, as the steam rises and turns the rotor blade assembly 112, the steam cools down. The condensed steam then passes over the top of the turbine stator housing 12 and comes down around the outside of the rotor blade assembly 112 and into the condenser 118 in the upper part of the lower chamber 134 of the hanging turbine as water. The water then passes through the one-way valves 128 and 130, which allows the water to drop into the boiler 116 but prevents steam from rising up into the condenser 118.

Figure 8:
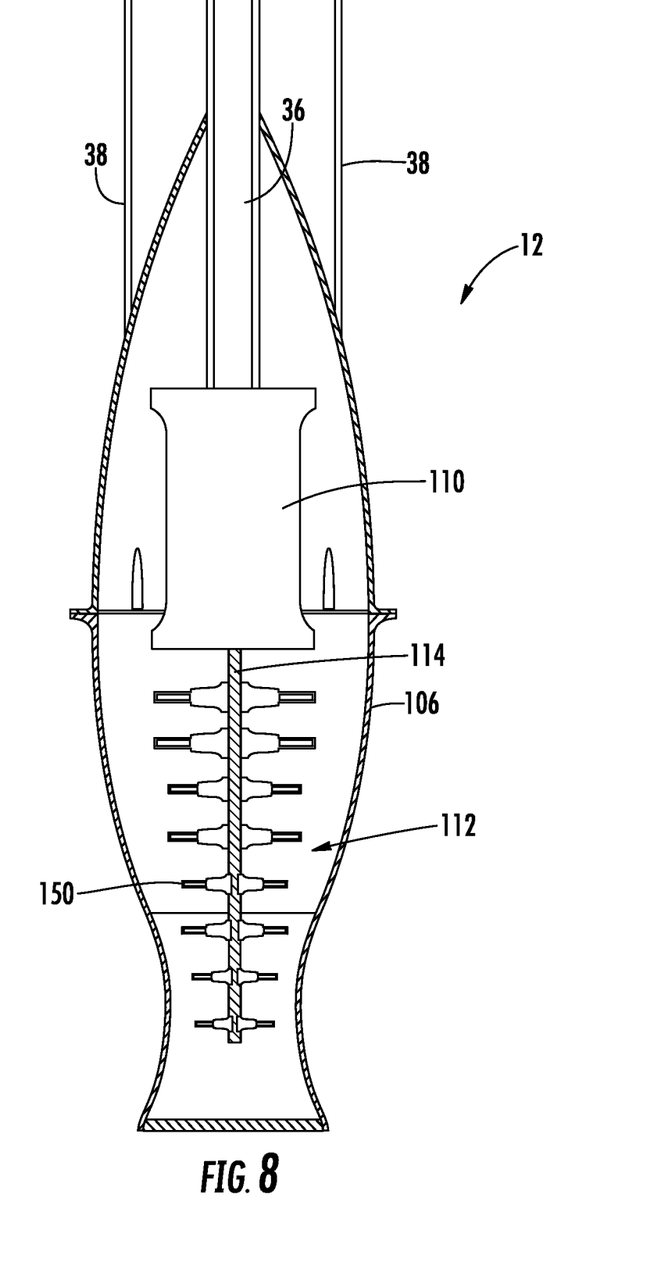
FIG. 8 is cross-sectional side view of an open turbine engine usable in the geothermal power generation system.
Figure 9:
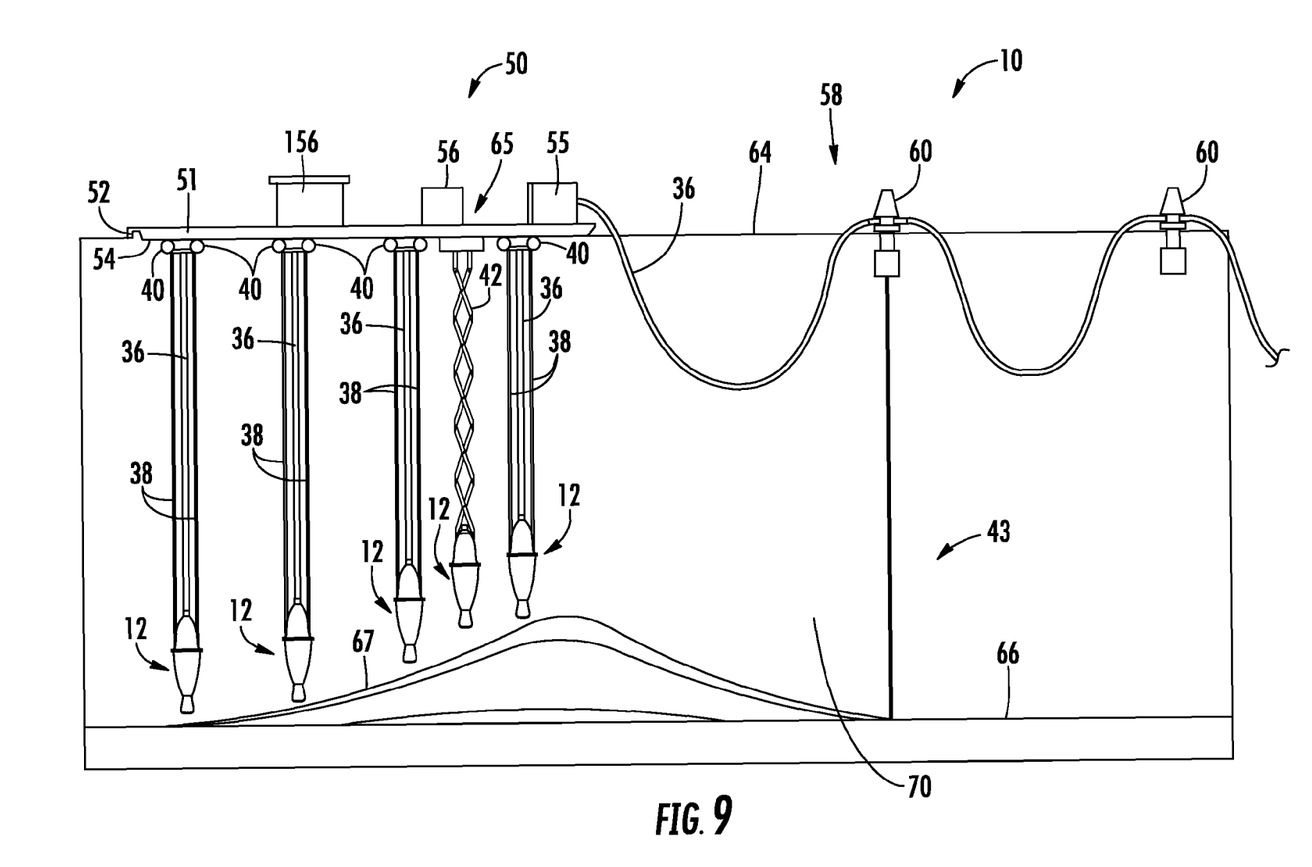
FIG. 9 is an elevation view of the geothermal power generation system including a marine support structure for marine applications.
Figure 10:
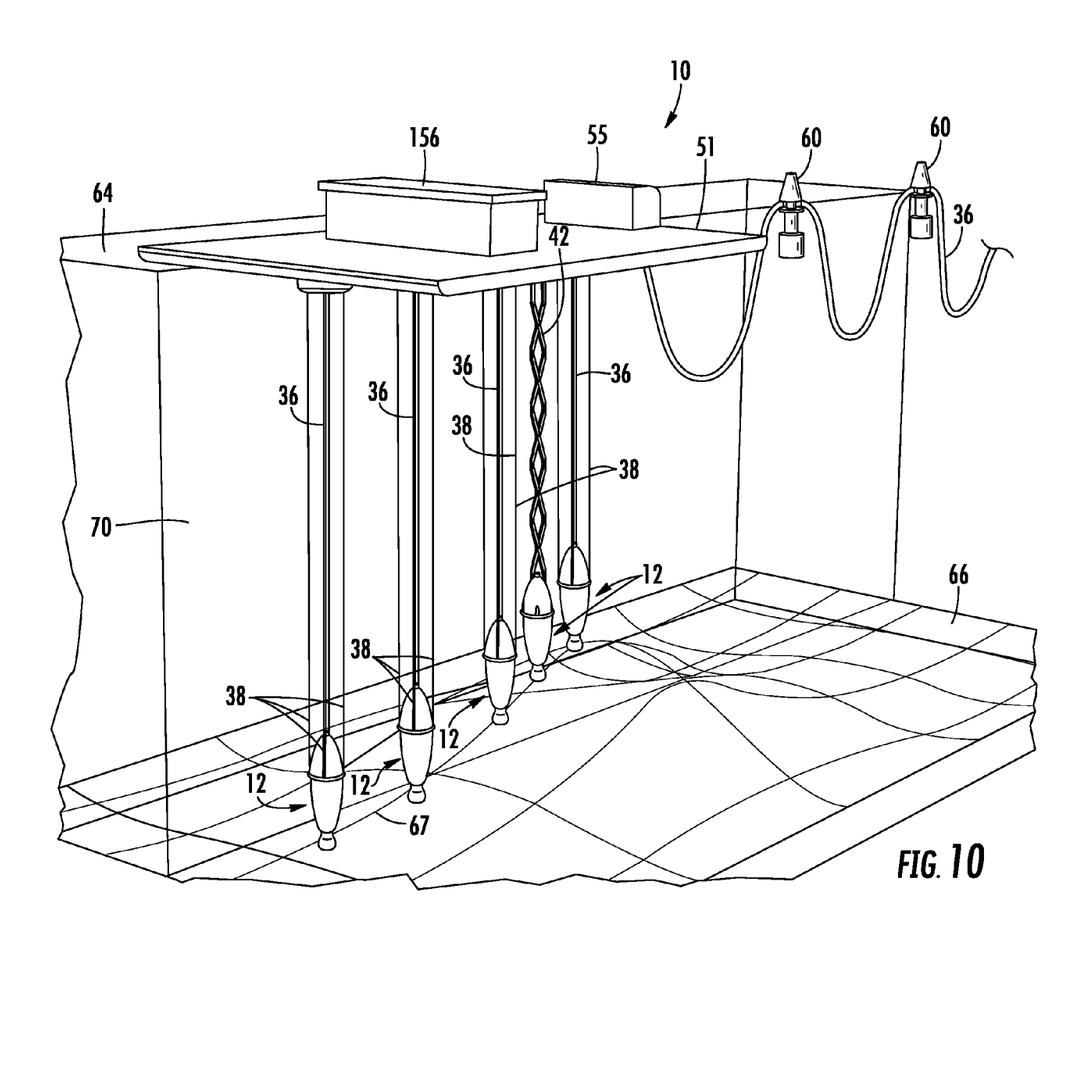
FIG. 10 is an elevation view of another embodiment of the geothermal power generation system including a marine support structure for marine applications.
Figure 11:
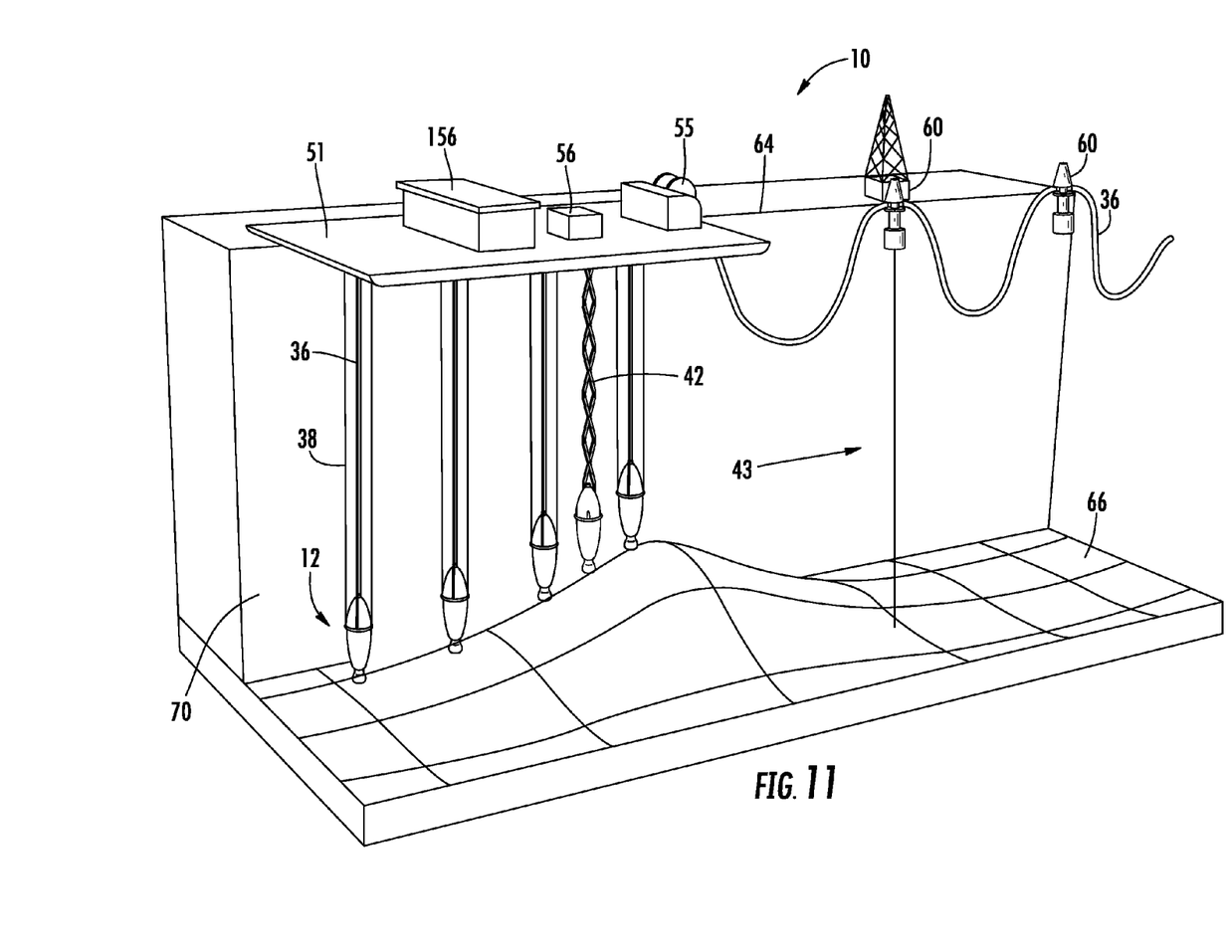
FIG. 11 is an elevation view of yet another embodiment of the geothermal power generation system including a marine support structure for marine applications.

In yet another embodiment, as shown in FIG. 8, a turbine engine 12 may be configured to be an open cycle turbine engine. The open casing design may use naturally occurring hot vapors, such as, but not limited to, steam created from seawater by a volcanic eruption as fuel. Gases, such as, but not limited to, volcanic gases, may be funneled into the turbine engine 12 and may turn the rotor blade assembly 112. The gases may then escape out at the top of the open hanging turbine engine 12. In this case, the generator 110 may be firmly secured to the hanging turbine housing 106, but may allow the steam to pass up and escape out on the surface of the ocean 66.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A closed loop geothermal power generation turbine, comprising:
    a turbine housing forming at least one internal cavity;
    a generator positioned within the turbine housing;
    a rotor blade assembly positioned within the turbine housing and in communication with the generator via a drive shaft;
    a boiler in communication with the rotor blade assembly;
    a condenser positioned within the turbine housing and in fluid communication with at least one exhaust outlet of the rotor blade assembly and the boiler;
    at least one check valve positioned between the condenser and the boiler; and
    wherein the at least one check valve extends circumferentially around the rotor blade assembly.

2. The closed loop geothermal power generation turbine of claim 1, wherein the condenser is positioned between an outer surface of the rotor blade assembly and an inner surface of the turbine housing.

3. The closed loop geothermal power generation turbine of claim 1, wherein the at least one check valve comprises an upper and a lower check valve extending circumferentially around the rotor blade assembly.

4. The closed loop geothermal power generation turbine of claim 1, wherein the at least one internal cavity is formed of an upper chamber housing the generator and a lower chamber housing the rotor assembly and condenser.

5. The closed loop geothermal power generation turbine of claim 1, wherein the lower chamber houses the boiler.

6. The closed loop geothermal power generation turbine of claim 1, wherein the rotor blade assembly is formed from a plurality of stationary rotor vanes and rotatable rotor blades.

7. The closed loop geothermal power generation turbine of claim 1, further comprising a ceramic wall circumferentially surrounding the rotor blade assembly and forming an inner wall of the condenser to promote condensation.

8. The closed loop geothermal power generation turbine of claim 1, further comprising a ceramic outer wall defining outer aspects of the condenser.

9. A closed loop geothermal power generation turbine, comprising:
    a turbine housing forming at least one internal cavity;
    a generator positioned within the turbine housing;
    a rotor blade assembly positioned within the turbine housing and in communication with the generator via a drive shaft;
    a boiler in communication with the rotor blade assembly;
    a condenser positioned within the turbine housing and in fluid communication with at least one exhaust outlet of the rotor blade assembly and the boiler;
    wherein the at least one internal cavity is formed of an upper chamber housing the generator and a lower chamber housing the rotor assembly and condenser;
    wherein the condenser is positioned between an outer surface of the rotor blade assembly and an inner surface of the turbine housing;
    at least one check valve positioned between the condenser and the boiler; and
    wherein the at least one check valve extends circumferentially around the rotor blade assembly.

10. The closed loop geothermal power generation turbine of claim 9, wherein the at least one check valve comprises an upper and a lower check valve extending circumferentially around the rotor blade assembly.

11. The closed loop geothermal power generation turbine of claim 9, wherein the lower chamber houses the boiler.

12. The closed loop geothermal power generation turbine of claim 9, wherein the rotor blade assembly is formed from a plurality of stationary rotor vanes and rotatable rotor blades.

13. The closed loop geothermal power generation turbine of claim 9, further comprising a ceramic wall circumferentially surrounding the rotor blade assembly and forming an inner wall of the condenser to promote condensation.

14. The closed loop geothermal power generation turbine of claim 9, further comprising a ceramic outer wall defining outer aspects of the condenser.

\* \* \* \* \*